United States Patent

[11] 3,624,553

[72] Inventor Nguyen Van-Tran
 Matawan Township, Monmouth County, N.J.
[21] Appl. No. 863,960
[22] Filed Oct. 6, 1969
[45] Patented Nov. 30, 1971
[73] Assignee Bell Telephone Laboratories, Incorporated
 Murray Hill, N.J.

[54] CYCLOTRON RESONATOR LASER IN A P-TYPE SEMICONDUCTOR
 5 Claims, 5 Drawing Figs.
[52] U.S. Cl. .................................................. 331/94.5, 317/234, 330/4.3
[51] Int. Cl. .................................................. H01s 3/18
[50] Field of Search .......................................... 331/94.5; 330/4.3; 317/234 (27)

[56] References Cited
 UNITED STATES PATENTS
 3,265,977 8/1966 Wolff .......................... 330/4.3
 3,368,161 2/1968 Hensel ......................... 331/94
 3,353,114 11/1967 Hanks et al. .................. 331/94.5

Primary Examiner—Ronald L. Wibert
Assistant Examiner—Edward S. Bauer
Attorneys—R. J. Guenther and Arthur J. Torsiglieri ABSTRACT: There is disclosed a cyclotron resonance laser of the type in which the Landau-level ladder is truncated either by the optical phonon or unequal spacings of the levels, in which the semiconductive crystal consists essentially of P-type germanium nearly compensated with antimony and in which, typically at low temperatures, the only effective acceptor level is a zinc energy level so deep in the band gap that the population inversion can be established by pumping radiation at 10.6 microns or 9.6 microns by a carbon dioxide molecular laser. In order to reduce the effective mass of heavy holes and to avoid reabsorption of the stimulated radiation by transitions between the heavy-hole and light-hole bands, suitable pressure, for example, uniaxial pressure, splits the heavy-hole and light-hole bands by about 0.02 electron volts.

CYCLOTRON RESONATOR LASER IN A P-TYPE SEMICONDUCTOR

BACKGROND OF THE INVENTION

This invention relates to apparatus for the stimulated emission of radiation and particularly to cyclotron resonance lasers. Laser is a well-known acronym which stands for light amplification by stimulated emission of radiation. As used in this context, light extends broadly to not only the visible region in the spectrum but to the infrared and ultraviolet regions, that is, from about 1,000 micrometers in the infrared to about 100 nanometers in the ultraviolet.

Several proposals have been made for cyclotron resonance lasers to fill the need for useful sources in the coherent wave electromagnetic spectrum between about 1,000 micrometers and about 50 micrometers in the infrared. Some of the prior proposals have suggested that sufficiently unequal spacings of the cyclotron energy levels created in a suitable material in the presence of a magnetic field can facilitate the establishment of a population inversion between two of the cyclotron energy levels, sometimes called Landau levels.

Another proposal, by P. A. Wolff in U.S. Pat. No. 3,265,977, issued Aug. 9, 1966, suggests that the Landau-level ladder can be truncated, so that the probability of reabsorption of the stimulated radiation is reduced, and the establishment of lasing action between two of the levels facilitated by disposing the two laser energy levels immediately below the energy level of the optical phonon in a low-effective-mass semiconductive material. The charge carriers in a semiconductive material have low effective mass if their response to an applied field makes them appear to have less mass than a similar free charge carrier in the same field.

While the use of very low-effective-mass materials such as indium antimonide has previously been considered to be highly desirable, it has not been possible to produce suitably high quality samples or crystals of such materials for use in a cyclotron resonance laser.

Recently a proposal has been made to employ P-type germanium in a cyclotron resonance laser. See the article, "Quantum Effects in Cyclotron Resonance Using a CW Cyanide Laser", by C. C. Bradley et al., *IEEE Journal of Quantum Electronics*, Vol. QE-4, page 733 Nov., 1968). It is clear from that article that the acceptor levels employed include at least one that is very near to the valence band edge. The operation of their device as a spectroscopic source shows that the energy levels are not sharply defined and further that the absorption lines of the material are undesirably broad, as recognized in that article. For such reasons, a cyclotron resonance laser according to that proposal is not feasible even though the configuration may be useful for submillimeter resonance spectroscopy. While germanium is a desirable material, because of the wealth of information available pertaining to the growth, purification and processing of that material for devices, substantial improvements are needed to produce a useful cyclotron resonance laser therefrom.

SUMMARY OF THE INVENTION

According to my invention, a cyclotron resonance laser employing P-type germanium is provided by nearly compensating the P-type germanium so that, under appropriate conditions, the only effective acceptor level is a level so deep in the band gap that a pumping by coherent radiation at 10.6 micrometers or 9.6 micrometers from a carbon dioxide molecular laser provides a population inversion. More broadly, even the 28 micrometer water vapor laser, or other continuous-wave laser having a wavelength shorter than about 30 micrometers, is suitable for pumping a cyclotron resonance laser in germanium if a single acceptor impurity energy level is provided more than 30 millielectron volts from the valence band edge.

Advantageously, in such configurations the absorption lines are relatively sharp and few in number; and the optical phonon can readily be used to facilitate the population inversion.

In one specific embodiment of my invention, the single effective acceptor level is a zinc acceptor level about 90 millielectron volts from the valence band edge.

According to an optional feature of my invention, the heavy-hole and light-hole bands are split by about 20 millielectron volts by the application of uniaxial pressure to the germanium crystal to avoid reabsorption of the coherent radiation by transitions between the heavy-hole band and light-hold band.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENT

Figure 1:
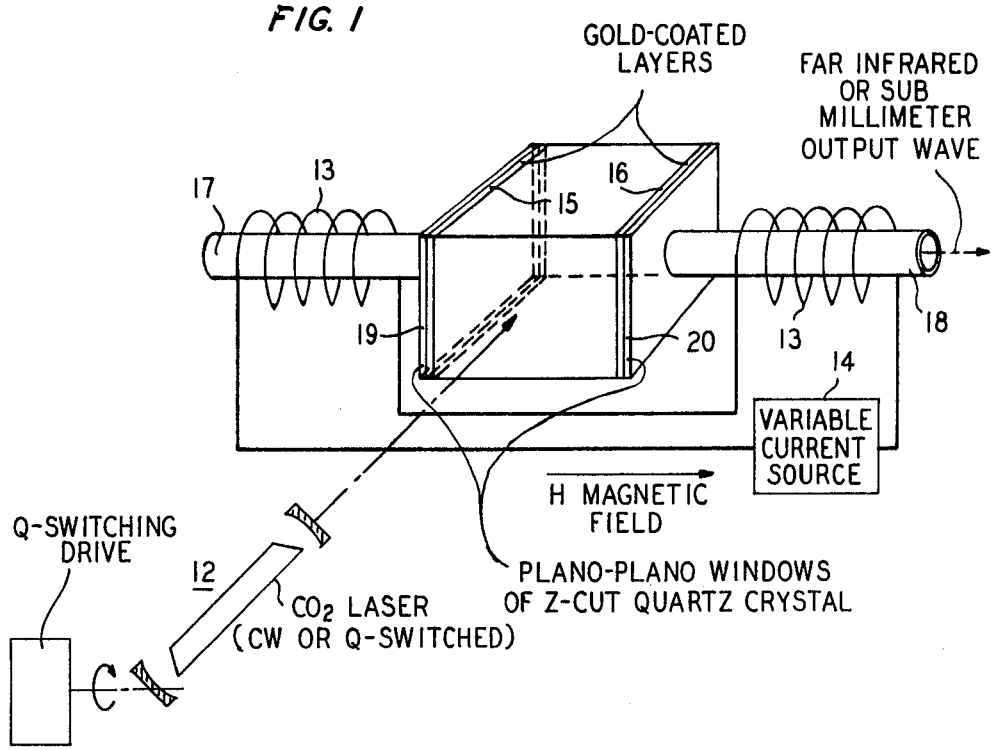
FIG. 1 is a partially pictorial and partially schematic illustration of a preferred oscillator embodiment of my invention.

In the embodiment of FIG. 1 it is desired to produce coherent infrared oscillations at a frequency dependent upon the value of a variable applied magnetic field. Broadly tunable coherent radiation is to be derived from shorter wavelength laser radiation that is not broadly tunable. Moreover, the tuning range extends into heretofore relatively inaccessible regions of the infrared spectrum.

In FIG. 1 the preferred embodiment of an oscillator according to my invention comprises a crystal 11 of P-type single-crystal germanium which has been substantially compensated, typically with antimony, leaving only a single deep acceptor energy level provided by zinc at about 90 millielectron volts from the valence band edge. The crystal 11 is pumped by a continuous-wave of Q-switched molecular laser 12, illustratively a conventional carbon dioxide laser operating at 9.6 to 10.6 micrometers to enable the lasing action. To provide cyclotron energy levels between which the pumping action produces a population inversion and simultaneously to provide the tunability, the magnetic field is applied to crystal 11 along its 111 crystalline axis by a split magnetic field coil 13, sometimes called a Helmholtz coil, energized from a variable current source 14. A population inversion is a nonequilibrium condition in which more particles of the medium have the energy of the higher level than have the energy of the lower level.

To resonate the radiation emitted by the inverted cyclotron resonance transition, an optical resonator is provided by the gold coatings 15 and 16 on opposed parallel surfaces of crystal 11 orthogonal to the 111 crystalline direction. The stimulated emission of radiation is thereby facilitated and the condition for oscillation can be satisfied.

Optionally, uniaxial compressive stress is applied to crystal 11 by means of the aluminum or brass tubes 17 and 18. In order to have very homogenous uniaxial compressive stress, the pressure will be communicated to the crystal from the aluminum or brass tubes 17 and 18 by two z-cut quartz plano-plano windows 19 and 20. The aluminum or brass tubes 17 and 18 are aligned concentric with the axis of the coils 13 and are hollow in order to transmit the output coherent radiation.

Any suitable mechanism may be employed for pressing the near ends of tubes 17 and 18 against quartz windows 19 and 20, respectively. Examples of such mechanisms are given in the cyclotron resonance maser U.S. Pat. of J. C. Hensel, No.

3,368,161, issued Feb. 6, 1968. Since coating 15 may be opaque and coating 16 is partially transparent to transmit the output radiation, a weight-loading technique is readily implemented. In that case, tube 17 may be stood vertically on a rigid surface to support crystal 11 with quartz window 19 and coating 15 oriented in a horizontal position on tope of tube 17; while tube 18 rests vertically on top of quartz window 20 and coating 16 at the top of the crystal. Tube 18 is then pressed against quartz window 20 and coating 16 and the rest of the assembly below coating 16 by loading tube 18 with weights, which may be mounted on a platform (not shown) attached to the outer perimeter of tube 18.

The crystal 11 is a single crystal of highly pure germanium which has been partially compensated with antimony and provided with an uncompensated zinc concentration of about $7\times10^{14}$ atoms per cubic centimeter.

More specifically, the doped germanium crystal is grown by standard horizontal zone-melting procedures. High purity, zone refined, polycrystalline germanium was used as a starting material; and a (111) oriented seed was used to grow a single-crystal ingot.

At the start of single-crystal growth, a calibrated antimony doping pellet is added to the melt. This pellet contains sufficient antimony to produce $10^{15}$ donor atoms per cubic centimeter in the grown crystal. Zinc is added to the melt from the vapor phase. The zinc concentration in the grown crystal is controlled by variation of the zinc vapor pressure over the melt. In order to have the first zinc acceptor level, which lies at about 40 millielectron volts above the valence band edge, fully compensated by donor electrons, the zinc concentration is kept less than the antimony concentration. By fully compensated, I mean that the uncompensated concentration of holes for the first acceptor level of zinc is more than two orders of magnitude lower than that of the holes of the effective (second) acceptor level. From the measurements which have been made on the grown crystal, the total zinc concentration is estimated to be typically about $7\times10^{14}$ atoms per cubic centimeter. For four typical samples grown by this technique, the zinc concentration calculated from room temperature hole concentration lies in a range from 2.4 to $7.1\times10^{14}$ and averaging about $6.6\times10^{14}$ atoms per cubic centimeter. The calculated maximum number of holes available (effective acceptor level concentration) for excitation into the valence band is $3.4\times10^{14}$ per cubic centimeter. The hole concentration could be as low as $1\times10^{13}$ per cubic centimeter. As will be noted hereinafter, the energy of a hole increases as it moves from its impurity center toward the valence band or deeper into the valence band. Thus, increasing energy lies in the downward direction in the typical energy-momentum diagram, examples of which will be discussed hereinafter. This sense of energy increase is opposite to that which obtains for an electron, which would participate in the cyclotron resonance in an N-type material.

For the typical laser according to my invention, the axial magnetic field provided by coil 13 in crystal 11 can vary through the range from 5 kilogauss to more than 100 kilogauss, but preferably in the range from 5 to 50 kilogauss, the exact value depending on the frequency of coherent radiation which it is desired to produce.

Details of a continuous-wave or Q-switched $CO_2$ laser employed in practicing my invention may be found in the copending U.S. Pat. application of C. K. N. Patel, Ser. No. 814,510, filed Mar. 28, 1969, and assigned to the assignee hereof, with the modification for Q-switched operation that one end mirror of the external reflector version of that laser is rotated about an axis transverse to the laser axis at a rate of 120 cycles per second.

In the operation of the embodiment of FIG. 1 the continuous-wave or Q-switched laser 12 is operated at a wavelength of 10.6 microns, supplying typical power from about 10 watt to 1,000 watt peak power to the center of crystal 11, with a typical spot size from $10^{-2}$ to 1 square centimeters, respectively.

For a relatively short wavelength far infrared cyclotron resonance laser, the value of the field supplied by coil 13 is set at 50 kilogauss by appropriate adjustment of the variable current source 14.

Figure 3:
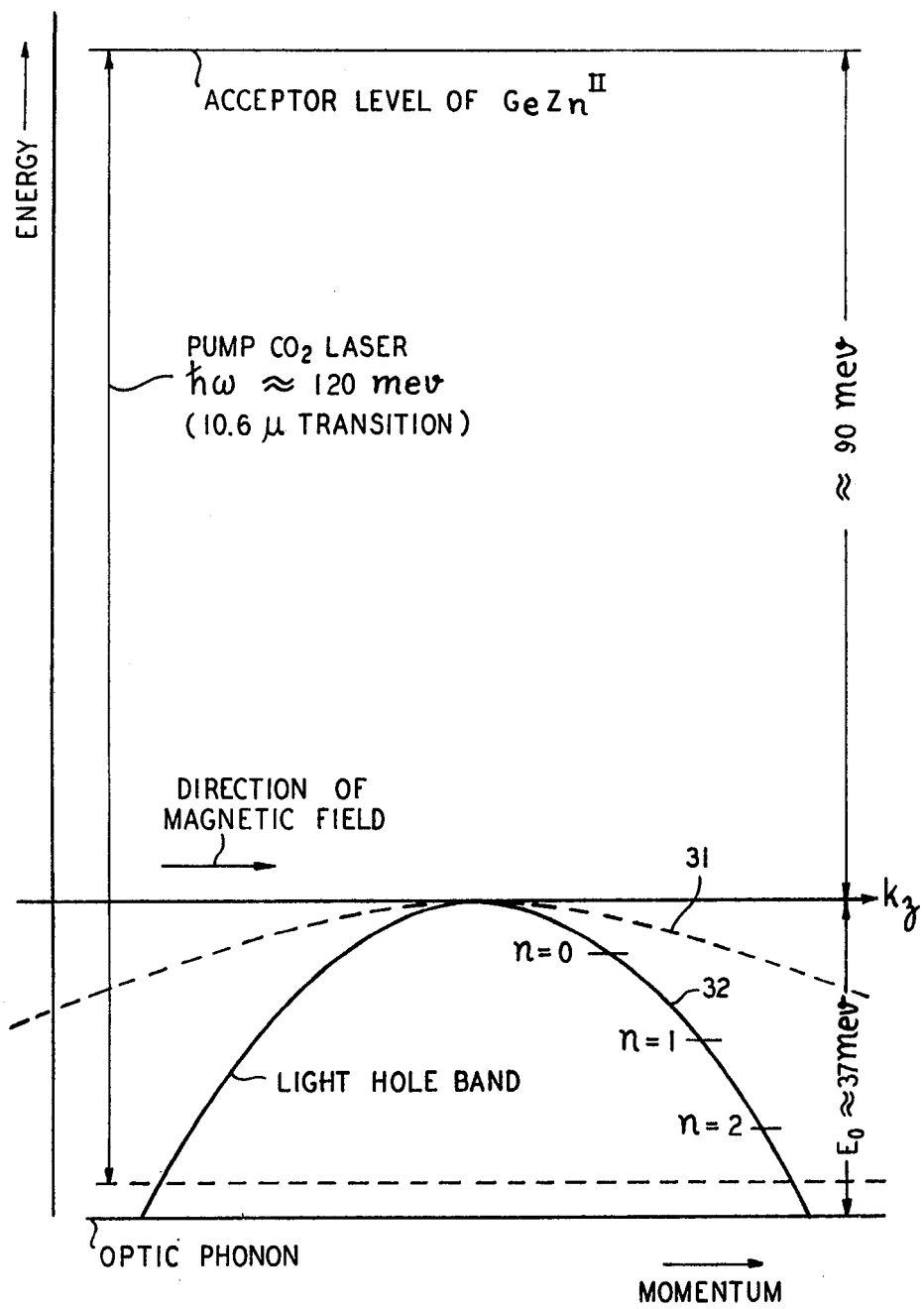
FIG. 3 shows an energy-level-momentum diagram of the active material without applied stress.

Sufficient uniaxial stress is applied through tubes 17 and 18, illustratively 2,000 kilograms per square centimeter, to make the ratio, $m_h{}^*/m_l{}^*$, of the effective mass of a heavy hole to the effective mass of a light hole about 2.5 instead of 7, as is the case without stress. This stress also separates the heavy-hole band from the light-hole band by about 0.02 electron volts. This can be seen more readily in the energy-momentum diagrams of FIGS. 3 and 4. In FIG. 3 the heavy-hole band is represented by curve 31 and the light-hole band by curve 32. The vertical axis is energy in millielectron volts and the horizontal axis represents a component of momentum of the holes in compatible units, with the magnetic field applied along the 111 crystalline direction. This momentum is the component of momentum parallel to the field direction. Curve 31 represents the so-called heavy-hole band; and curve 32 represents the so-called light-hole band. Because of the different effective masses for heavy holes and light holes, the application of a given field to crystal 11 will produce cyclotron energy levels, represented by short horizontal lines intersecting curves 31 and 32, which are seven times more closely spaced on curve 31 than they are on curve 32. When the vertices of curves 31 and 32 are touching, or almost touching, even for high values of magnetic field, as in FIG. 3, it is important to prevent energy resulting from transitions between levels of curve 32 from being reabsorbed by transitions between curves 31 energy-level-momentum 32. In contrast, in FIG. 4 it may be seen that the uniaxial stress along the 111 crystalline direction has separated curves 31' and 32', corresponding to the modified heavy-hole and light-hole bands, respectively, so that their vertices are now separated by an appropriate amount, illustratively 0.02 electron volts. Due to the highly unequal spacings of the higher energy heavy-hole levels, now it is much easier to select a finally adjusted value of field which will prevent the reabsorption by transitions between levels of curve 31. Hole energy increases as the holes move downward in FIGS. 3–5.

Figure 4:
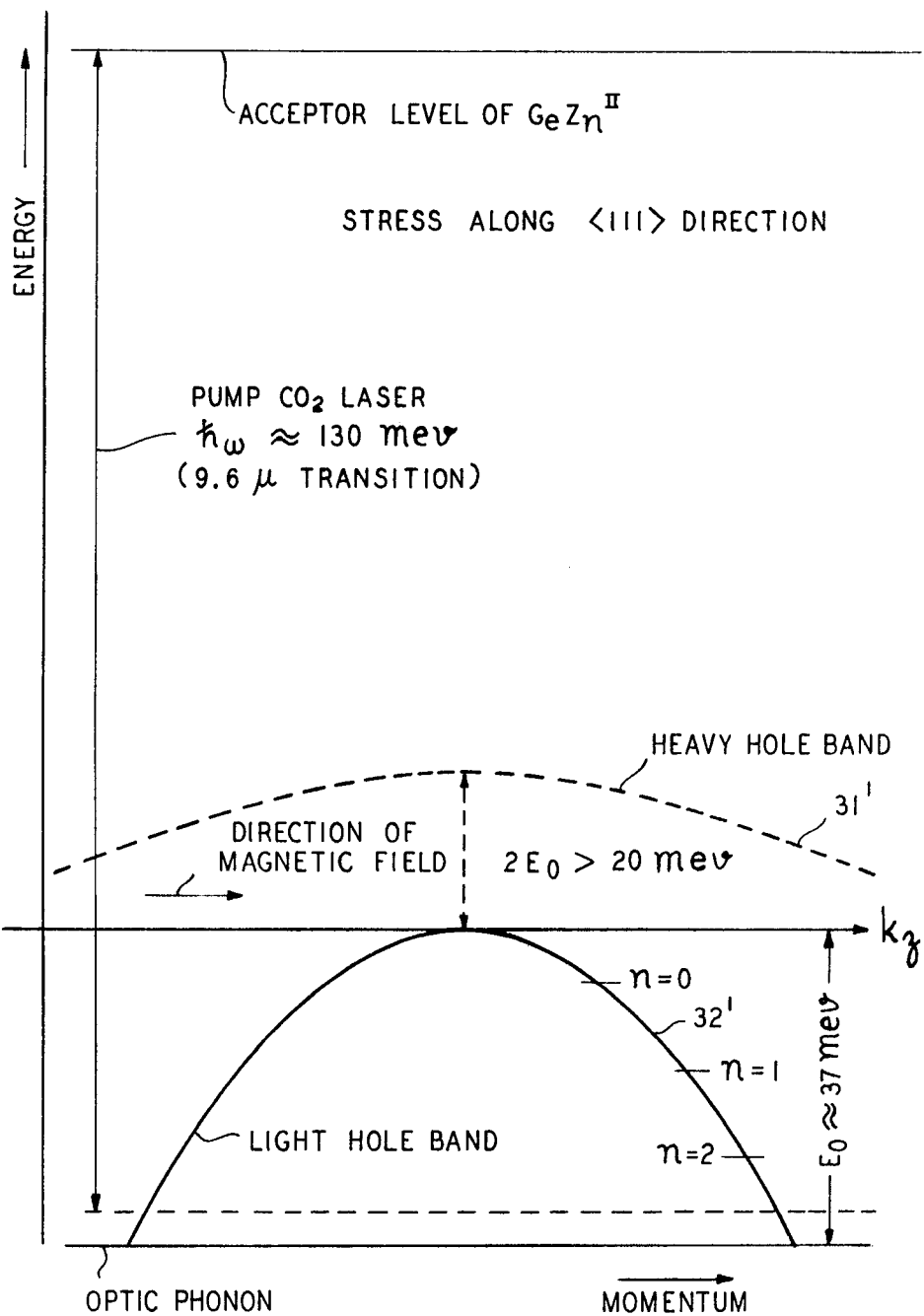
FIG. 4 shows an energy-level-momentum diagram of the active material with uniaxial stress applied along the 111 crystalline direction.

In FIG. 4 the long arrow adjacent to the vertical axis represents the photon energy of the $CO_2$ laser and illustrates how it can move a hole from the acceptor level to a higher level somewhere between the third cyclotron resonance level (n=2), for example, and the optical phonon. This pumping will selectively populate the n=2 level with holes which can then emit coherent radiation as they are stimulated to make the transition to the n=1 level. The cyclotron energy levels about the n=0 levels will be termed elevated energy levels, despite their downward displacement in the diagram.

Additional population inversion is produced by transition from states in the n=1 to states in the n=0 level. The n=0 level is spaced from the n=1 level by a different energy from the spacing between the n=1 and the n=2 levels.

In spite of the utility of the uniaxial stress in facilitating population inversion, it is still feasible to operate the oscillator of FIG. 1 without stress, as can be explained with reference to the curves of FIG. 3. In this case the value of field must be carefully selected, illustratively by trial and error, in order to prevent the reabsorption of the stimulated radiation.

Operation without uniaxial stress has the advantage that the powerful 10.6 micron transition can very efficiently pump the upper laser level. In contrast, in the embodiment of FIG. 4 having the applied uniaxial stress designated above, it is desirable to pump the crystal 11 at slightly higher photon energy with the 9.6 micron-coherent radiation from the carbon dioxide laser, even though the power level is lower, as indicated on the diagram of FIG. 4. In this respect FIG. 4 is merely illustrative and is not meant to imply that the crystal with uniaxial stress applied cannot be pumped by the 10.6 micron laser transition. While some sacrifice of pumping efficiency may occur, more laser power is generally available at 10.6 microns than at 9.6 microns.

Further details of the pumping process are as follows. The pumping rate must be sufficient and the lifetime of the holes long enough that the population of the holes in the n=2 level will not relax to the n=1 level until they are stimulated to make transition. To this end the crystal should be kept cold, preferably about 4° K. When stimulated by a sort of avalanche pressure that builds up from spontaneous radiation, the resonating of the stimulated radiation by the optical resonator provides the emission of coherent radiation of quanta or photons of energy $h\omega_c$, where $\omega_c$ is the cyclotron frequency of light holes in the germanium crystal 11. More specifically $$\omega_o = \frac{eH_{dc}}{m_l^* c} \quad (1)$$

where $e$ is the electronic charge, $H_{dc}$ is the applied magnetic field strength, and $c$ is the velocity of light.

Figure 2:
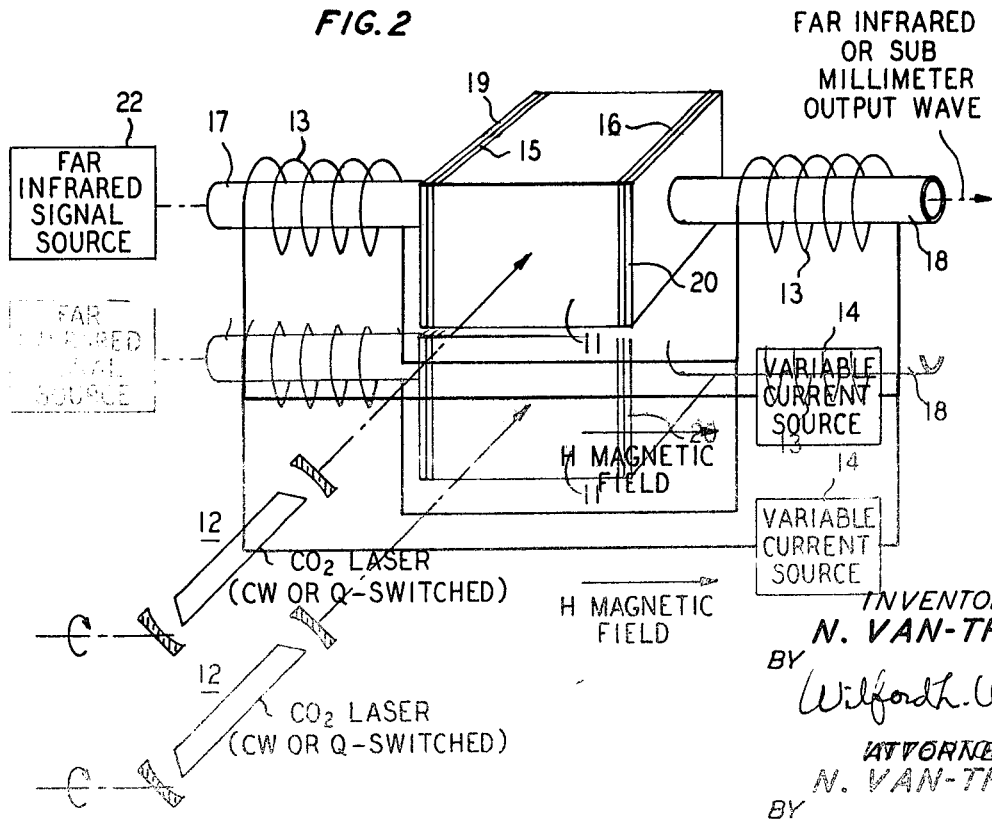
FIG. 2 is a partially pictorial and partially schematic illustration of a preferred amplifier embodiment of my invention.

The device of FIG. 1 can also be modified to operate as an amplifier, as shown in the modified embodiment of FIG. 2.

In FIG. 2 the differences from the embodiment of FIG. 1 are that no optical resonator is provided and that a source of an input modulated infrared signal at the desired wavelength of operation, e.g., 100 micrometers, is provided from a source 22 to propagate through tube 17 into crystal 11 collinearly with the direction of the field. The amplified modulated infrared radiation is extracted from crystal 11 through tube 18 and received in a suitable utilization apparatus, for instance, an infrared detector such as a Golay cell.

The operation of the invention as an amplifier is straightforward and is similar to that of other laser amplifiers.

It is a further advantage of my invention that the very deep acceptor levels which are characteristic of the above-described embodiments and the relatively short wavelength pumping, together with the application of sufficient uniaxial stress, make it possible to get far infrared lasing action between Landau levels of the heavy-hole band. Moreover, these heavy-hole cyclotron resonance energy levels, or Landau levels, are so very unequally spaced that the position of the optical phonon with respect to them is nearly irrelevant to the operation of the invention so long as both upper and lower laser levels are below the energy of the optical phonon.

Figure 5:
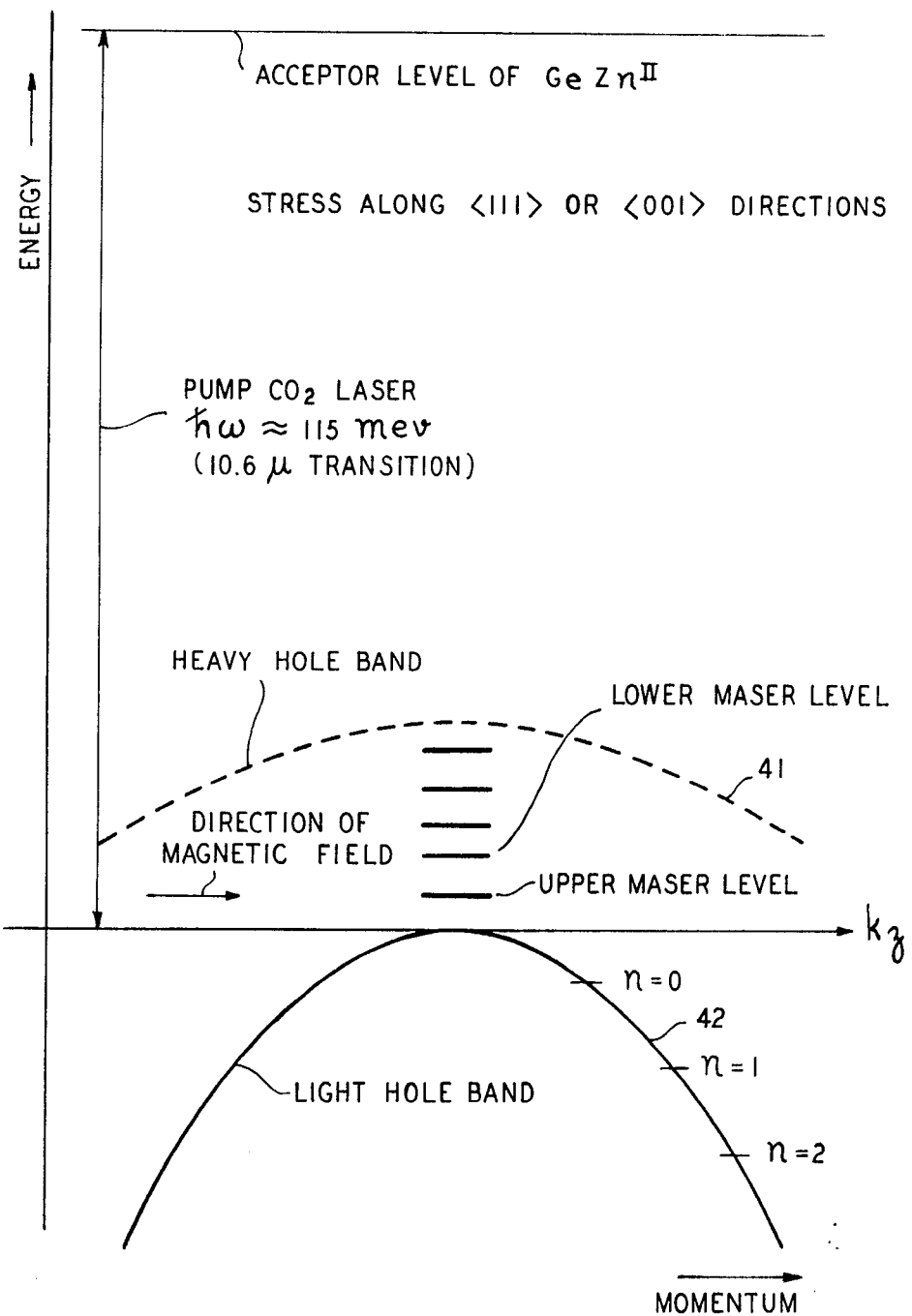
FIG. 5 shows an energy-level versus momentum diagram for the stressed active material pumped by a sufficiently long wavelength radiation to employ heavy-hole band transitions only.

The operation of such a modified embodiment is explainable from the energy-momentum diagram of FIG. 5 and would be implemented in a modified oscillator of the type shown in FIG. 1 by supplying 10.6 micron radiation from laser 12 while the uniaxial stress was increased to about 3,000 Kg./cm.$^2$ to provide a spacing of about 20 millielectron volts between the vertices of the heavy-hole and light-hole bands. An applied magnetic field of 100 kilogauss will now supply sufficiently few heavy-hole resonance energy levels between these two vertices of curves 41 and 42, respectively, to permit the efficient pumping of the crystal, the establishment of a population inversion, and the achieving of lasing action. Illustratively, the output radiation obtained for the values just specified is about 10 millielectron volts.

As a further modification of the embodiments of FIGS. 1 and 2, it is possible to use another single deep acceptor level in germanium, with the choice of a suitable laser. By deep acceptor levels I mean those lying at least 30 millielectron volts (0.030 electron volts) from the valence band edge up to about 160 millielectron volts (0.160 electron volts) from the valence band edge. In each case, other acceptor energy levels of that impurity are suitably compensated by an impurity of opposite type.

In contrast, the above-cited article by Bradley et al. clearly contemplates acceptor levels only about 2 or 3 millielectron volts from the valence band edge.

A good example of a modified embodiment satisfying the above-designated characteristics, is the use of a first deep cadmium acceptor level about at 50 millielectron volts from the valence band edge. The crystal 11 is then pumped with a modified laser 12, preferable a 28 micrometer water vapor laser of the type well-known in the art. In this embodiment I consider it important to apply uniaxial stress to shift the heavy-hole band from the light-hole band by about 10 millielectron volts.

I claim:

1. Apparatus for the stimulated emission of radiation of the type comprising a crystal of material including charge carriers having an effective mass less than the mass of a free electron, means for supplying at least two cyclotron energy levels between which a population inversion of the majority carriers of said material can be established, and means for establishing said population inversion between said two cyclotron energy levels, said apparatus being characterized in that said material consists essentially of P-type germanium in which a single effective acceptor energy level lies deeper than 30 millielectron volts from the valence band edge, said germanium being substantially compensated with respect to all other acceptor levels, and the means for establishing a population inversion comprises a laser having a photon energy at least equal to the sum of the energy of said acceptor level from said valence band edge and the energy of an elevated cyclotron resonance energy level within one of the light-hole and heavy-hole bands within the valence band.

2. Apparatus of the type claimed in claim 1 including means for splitting the heavy-hole band and the light-hole band in the valence band by an amount effective to prevent reabsorption of the emitted radiation.

3. Apparatus of the type claimed in claim 1 in which the single effective acceptor level lies between 30 millielectron volts and 160 millielectron volts from the valence band edge and the continuous-wave laser has an effective photon energy between the aforesaid minimum photon energy and an effective photon energy about 30 millielectron volts larger than that minimum energy.

4. Apparatus of the type claimed in claim 3 in which the single effective acceptor energy level is a zinc acceptor level providing holes in a concentration of at least $1 \times 10^{13}$ per cubic centimeter and all other acceptor levels are substantially compensated by antimony.

5. Apparatus of the type claimed in claim 4 in which the means for splitting the heavy-hole and light-hole bands provides sufficient uniaxial pressure in a direction collinear with the magnetic field to split the light-hole band and heavy-hole band by at least 20 millielectron volts.

* * * * *